W. R. LAZENBY.
TRAPPER'S TOOL.
APPLICATION FILED FEB. 3, 1921.
1,395,122.
Patented Oct. 25, 1921.
5 SHEETS—SHEET 2.
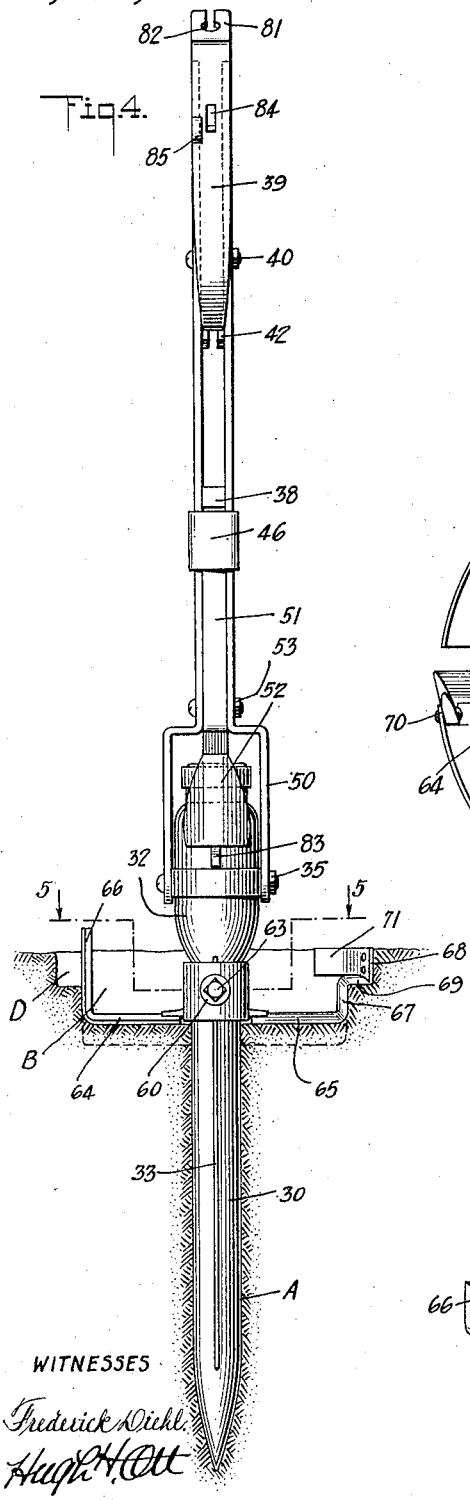
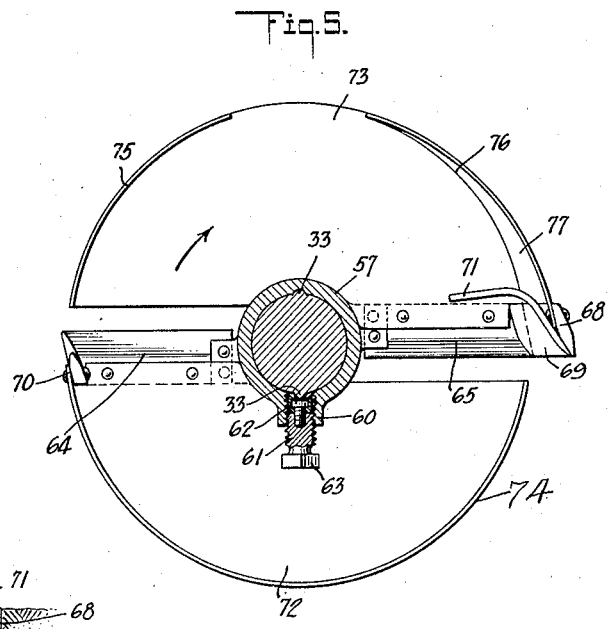
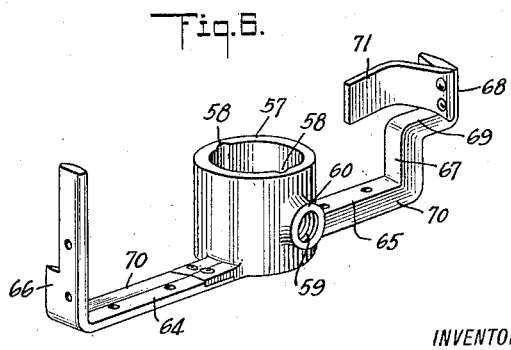
WITNESSES
Frederick Diehl.
Hugh H. Ott.
INVENTOR
W. R. LAZENBY
BY Munn & Co
ATTORNEYS

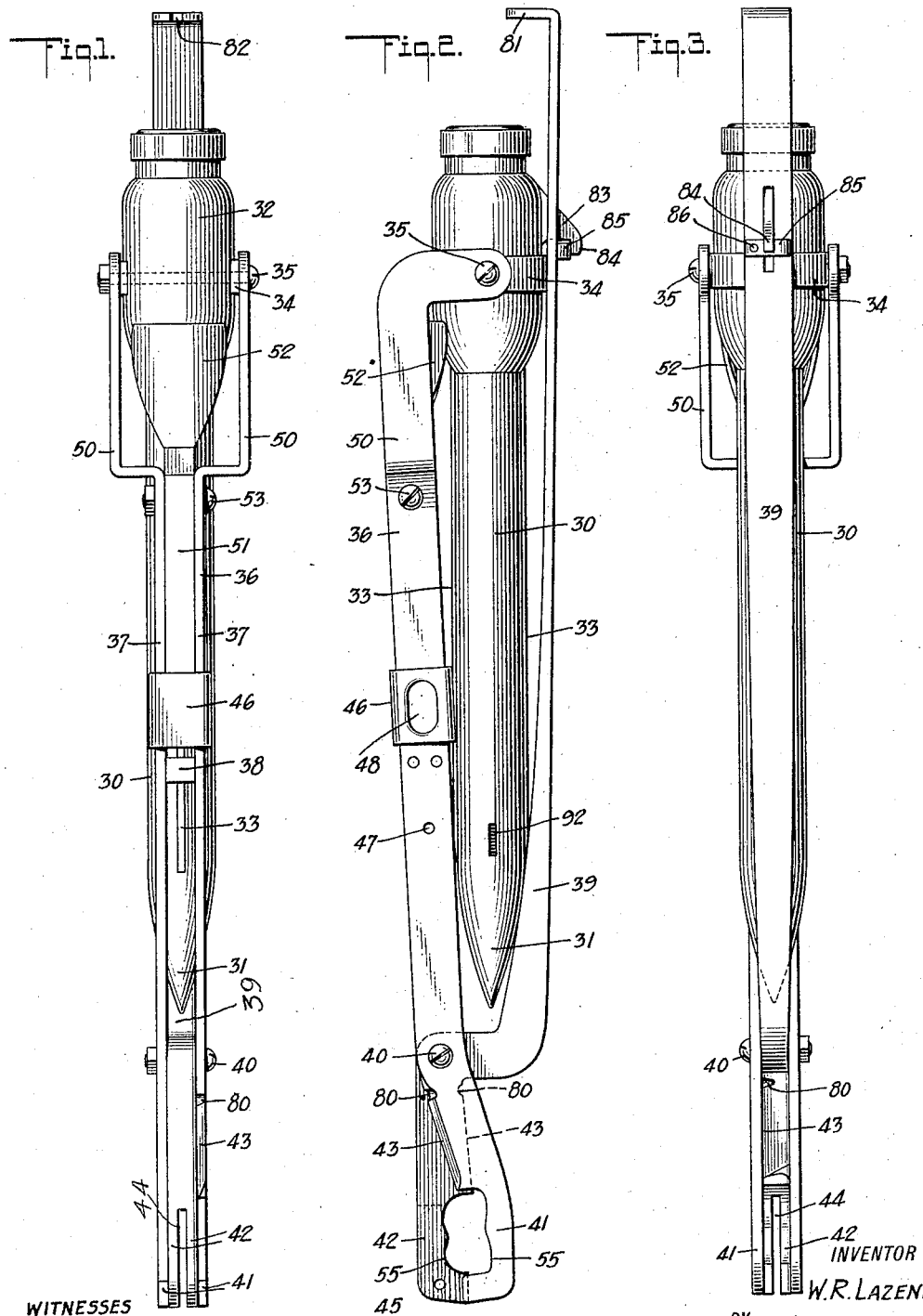

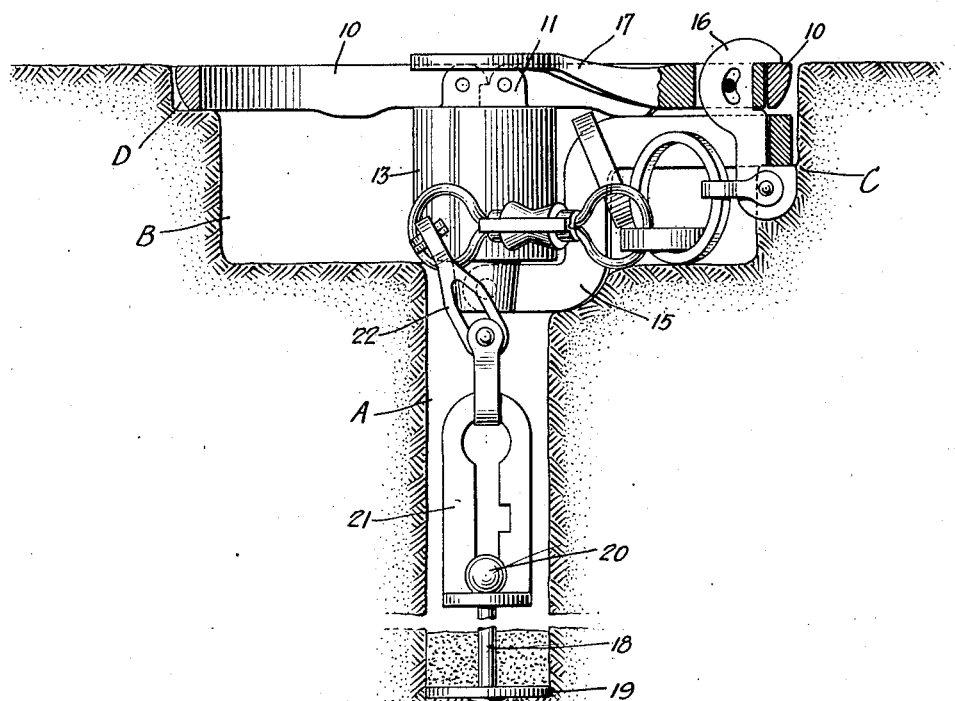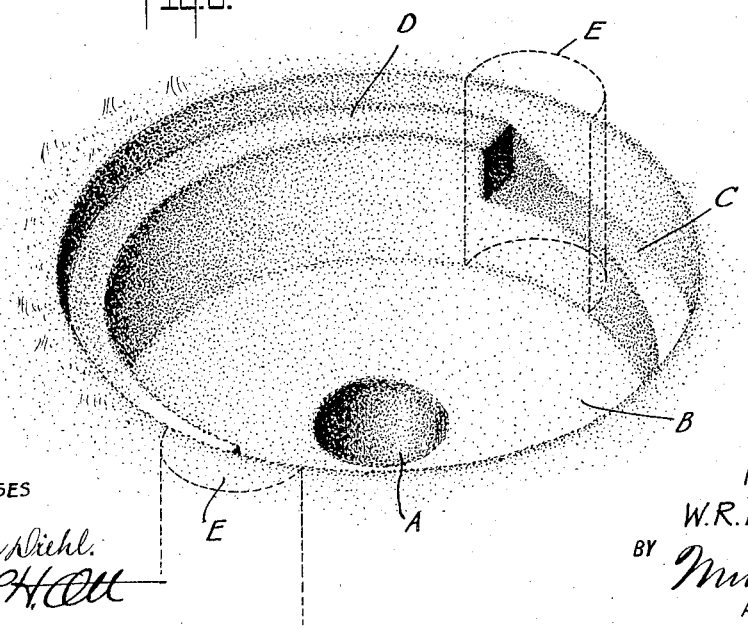

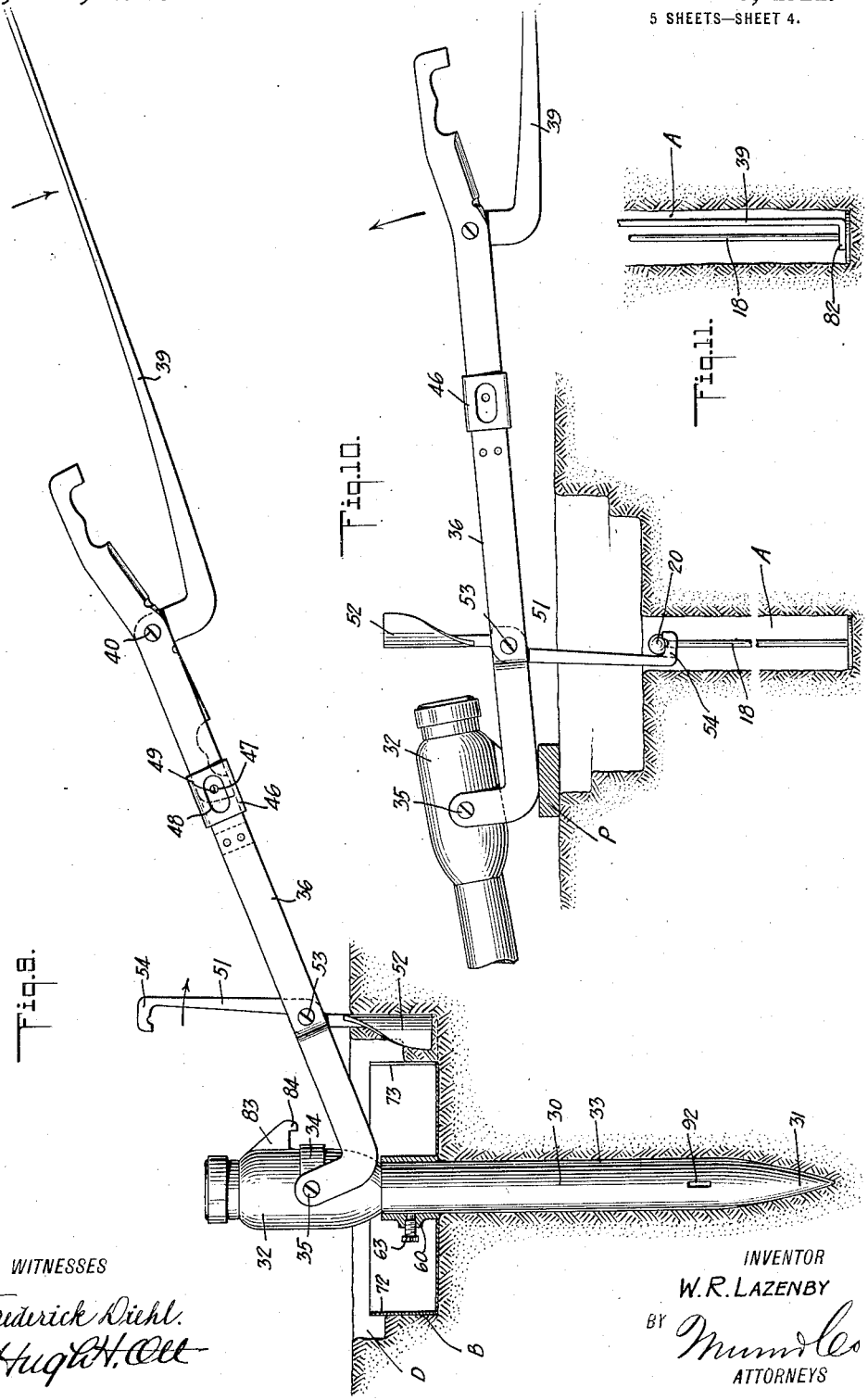

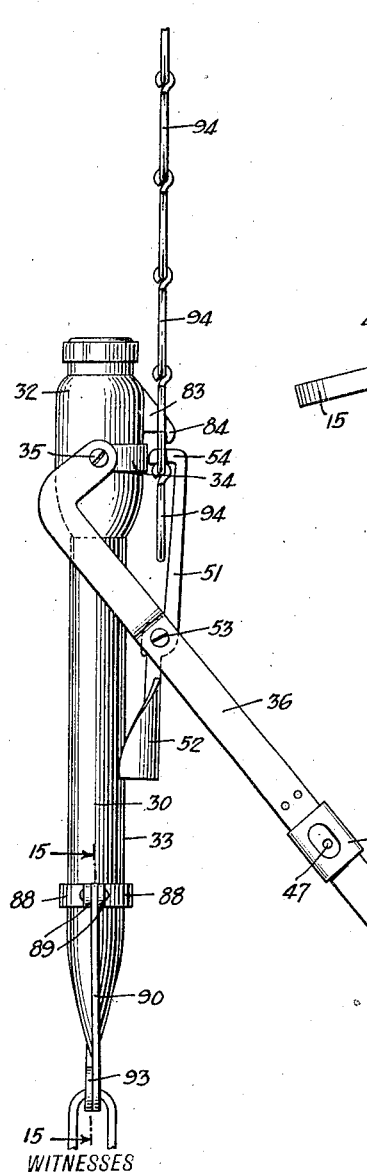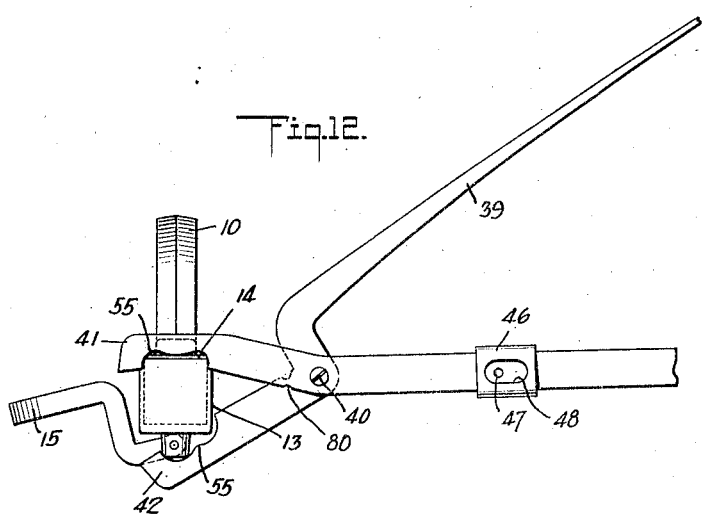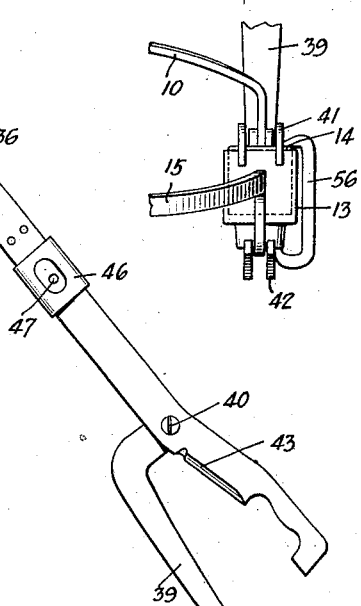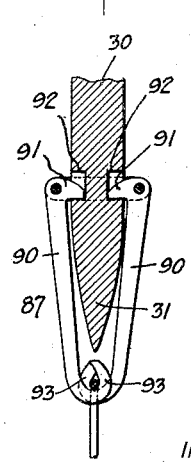

UNITED STATES PATENT OFFICE.

WILLIAM R. LAZENBY, OF HARDIN, MONTANA.

TRAPPER'S TOOL.

1,395,122.    Specification of Letters Patent.    Patented Oct. 25, 1921.

Application filed February 3, 1921. Serial No. 442,217.

*To all whom it may concern:*

Be it known that I, WILLIAM R. LAZENBY, a citizen of the United States, and a resident of Hardin, in the county of Big Horn and State of Montana, have invented a new and Improved Trapper's Tool, of which the following is a full, clear, and exact description.

This invention relates generally to a tool and has particular reference to a trapper's tool especially designed for use in connection with a trap of the character set forth in my prior application filed February 3, 1920, bearing Serial No. 356,098.

The invention contemplates the provision of a combination tool which will greatly facilitate the setting and removal of a trap of the character described, and which affords convenient means for preparing the ground to permit of the positioning of the trap and trap anchor.

Another object of the invention is to provide a tool of the character described which may be folded to occupy a minimum amount of space when not in use, whereby the same may be easily carried as a part of the trapper's outfit.

A further object of the invention resides in the provision of a tool of the character described, which is comparatively simple in construction, inexpensive to manufacture and which is of a strong and durable nature, whereby it may be subjected to extremely rough usage without danger of breakage.

With the above recited and other objects and advantages in view, the invention resides in the novel construction, combination and arrangement of parts set forth in the following specification, pointed out in the appended claims and illustrated in the accompanying drawings, in which—

Figure 1 is a front elevation of the tool illustrating the same in folded position.

Fig. 2 is a side elevation thereof.

Fig. 3 is a rear elevation of the same.

Fig. 4 is a front elevation of the tool illustrating the manner in which the same is employed for forming the anchor receiving well and the trap excavation.

Fig. 5 is a horizontal sectional view taken on the line 5—5 of Fig. 4.

Fig. 6 is a detail perspective view of the reamer attachment.

Fig. 7 is a vertical sectional view through the anchor well and trap excavation, illustrating the anchor and trap in applied position.

Fig. 8 is a perspective view illustrating diagrammatically the anchor well and the trap excavation.

Fig. 9 is a side elevation of the tool illustrating the use of the same for cutting the spring housing recesses in the side walls of the excavation.

Fig. 10 is a side elevation illustrating the use of the tool for removing the trap anchor.

Fig. 11 is a fragmentary detail view illustrating the use of the tool in positioning the trap anchor.

Fig. 12 is a fragmentary side elevation illustrating the manner of employing the tool for compressing and setting the trap springs.

Fig. 13 is a fragmentary front elevation thereof.

Fig. 14 is a view illustrating the use of the tool as a wire or chain stretcher.

Fig. 15 is a fragmentary sectional view taken approximately on the line 15—15 of Fig. 14.

Referring to Figs. 7 and 8 of the drawings, A designates the anchor receiving well, and B the trap excavation which is provided with semi-circular steps or shelves C and D which are disposed at diametrically opposite sides of the excavation. The trap with which the tool is adapted to especially function comprises a pair of swinging jaws 10—10 which are respectively pivoted at each end to one extremity of a link 11, which links are passed through the housing including telescopic sections 13 and 14. A bail 15 is pivoted at its opposite extremities to each of the links 11, and a suitable compression spring (not shown) surrounds the link and is interposed between the housing sections for normally exerting a force to effect the closing of the jaws 10. A retaining device 16 is designed to coact with the bail and one of the jaws to hold the same in set or open position as illustrated in Fig. 7 and a trigger 17 co-acts with the retaining means to effect the displacement of the same when an animal contacts therewith. The anchoring device includes a rod 18 which is provided at its lower end with an anchor plate or disk 19 adapted to be positioned and buried in the bottom of the well A. The upper extremity of the rod is provided with a spherical head 20 and a connecting plate 21 carried by an anchor chain 22 connected to the bail 15 which functions to removably associate the trap with the anchor. The trap excavation B is adapted to be provided with semi-circular recesses E at diametrically opposite points of the inner periphery as illustrated in dotted lines in Fig. 8 of the drawings, said recesses being preferably disposed at the juncture of the steps or shelves C and D.

The tool which constitutes the invention is designed especially for the purpose of preparing the ground for the reception of the trap and anchor and for facilitating the positioning of the same comprises a shank 30 constructed of any suitable material and pointed at its lower end as at 31. The opposite end is preferably enlarged to provide a head 32 which may function as a driving portion for hammering the shank into the ground. The shank is provided at diametrically opposite sides with a longitudinal rib 33 which constitute a means for reaming the sides of the opening formed by the shank to loosen the earth and facilitate the removal of the shank after the anchor well has been formed. A semi-circular band 34 embraces the head 32 and a bolt 35 is passed through the extremities of said band and the head to provide a pivot for the bifurcated arm 36 which arm consists of a pair of spaced bars 37 connected centrally thereof by a block or web 38. The free extremities of the bars 37 have pivoted therebetween a lever 39 by a transverse pivot bolt 40. The extreme outer ends of the bars 37 and the lever 39 constitute the jaws 41 and 42 of a pair of pliers. The inner edges of the jaws adjacent the pivot are beveled as at 43 to provide co-acting shearing edges. The outer extremity of the jaw 42 is slotted as at 44 and said slotted portions are transversely apertured as at 45 for a purpose to be hereafter set forth. A slide 46 embraces the arm 36 and the bars 37 of said arm are transversely apertured as at 47, said apertures being concentric with the apertures 45 in the jaw 42. The side walls of the slide 46 are provided with the openings 48. By this arrangement when the lever 39 is swung to the position illustrated in Fig. 9 of the drawings, the apertures 45 will register with the apertures 47 and the slide will be shifted to dispose the openings 48 in the side walls thereof in alinement with the apertures 45 and 47. A pin 49 passed through said apertures and the opening in the slide will function to retain the lever 39 in alinement with the arm 36 whereby said lever and arm will operate as a single rigid lever. The inner pivoted extremities of the bars 37 are offset laterally as at 50 and the shank 51 of a semi-circular spade 52 is pivoted between said bars adjacent the offset portion. The opposite free extremity of the spade shank 51 is provided with a right angularly disposed bifurcated foot 54. The position and arrangement of the spade permits the swinging of the same between the offset portions 50 of the bars 31 whereby the spade body may be disposed at either side of the arm or between the offset portions of the bars constituting the same. The inner confronting edges of the jaws of the pliers are cut away as at 55 in order to co-act with the telescopic housings 13 and 14 of the trap when the tool is employed for compressing the springs in setting the same as illustrated in Fig. 12 of the drawings. After the housings have been compressed, keys 56 are engaged therewith as illustrated in Fig. 13 of the drawings to retain the springs under tension until the combination trigger and retaining device has been associated with the bail and one of the jaws of the trap. It will be noted that the slotted portion 44 of the jaw 42 and the spaced relation of the bars 37 constituting the jaw 41, respectively accommodate the bail and the jaw to permit of free swinging of the same during the setting operation.

In the employment of the tool in its capacity for preparing the ground for the reception of the anchor and trap, use is made of a reamer attachment which is adapted to be associated with the shank. The reamer attachment includes a cylindrical sleeve 57 provided with longitudinal grooves 58 in the bore thereof which accommodate the ribs 33. The sleeve is provided with a threaded aperture 59 which communicates and alines with one of the grooves 58, said aperture passing through the exterior boss 60. A threaded shank 61 is operable in the threaded aperture 59 and has swiveled to its inner end a grooved head 62 which is designed to embrace and co-act with one of the ribs 33 to lock the reamer attachment to the shank. A manipulating head 63 is provided on the exterior extremity of the shank with which a wrench or other tool may be associated for operating the same. The sleeve is provided with diametrically oppositely projecting arms 64 and 65, the former being provided with an upstanding vertical extremity 66 and the latter with superposed upstanding portions 67 and 68 connected by a horizontal portion 69. The various portions of the arms 64 and 65 are beveled on one side to provide the cutting edges 70. The beveled or cutting edges 70 are disposed on opposite sides of the arms in such a manner that upon rotation of the sleeve, the cutting or reaming of the earth will be effected simultaneously by both arms. The cutting edge of the extremity 66 and the portion 67 are the same distance from the axial center of the sleeve while the cutting edge of the portion 68 is a substantially greater distance therefrom to effect a larger circumferential cut. A deflector wing 71 is riveted or otherwise secured to the portion 68 for a purpose to be hereafter set forth. Semicircular plates 72 and 73 are secured respectively to the upper sides of the arms 64 and 65, the former being provided with an upstanding annular flange 74. The latter disk is provided with spaced arcuate upstanding flanges 75 and 76, the latter having a stepped upper portion 77 which is eccentric to the axial center of the sleeve and which is secured between the portion 68 and the deflector wing 71 at its outermost end. This construction will constitute a reamer or substantially cylindrical excavating device which will afford means for receiving the earth cut by the cutting edges. The arrangement is such that the cutting edges are exposed from the cylinder formed by the semicircular flanged plates. The deflector blade 71 will function to deflect the earth inward upon its plate 73. In the use and operation of the tool when associated with the reamer for preparing the ground, the reaming device is associated with the shank 30 as illustrated in Figs. 4, 5, and 9. After the shank has been driven into the ground to a sufficient depth to bring the lower cutting edges in contact therewith, the arm 36 and lever 39 are locked in the position illustrated in Fig. 9 of the drawings and said arm and lever are utilized for the purpose of rotating the shank. When the reamer has formed the excavation B to the depth illustrated in Fig. 4 of the drawings, the depression thus formed in the ground will provide a continuous annular step D. To form the step or shelf C, the shank and reamer are given substantially a half turn which will effect an increased depth of the excavation B and will increase the depth of the shelf D to form the lower shelf C at one side thereof. The semi-circular spade 52 is then swung to the position illustrated in Fig. 9 of the drawings where it depends from the arm 36 and the lever is swung downwardly to form the semi-circular recess E. The earth thus removed is forced through the space between the flanges 75 and 76 into the cylindrical body of the reamer and the opposite side of the excavation is treated in a similar manner to form the opposite recess E. The shank and reamer are then withdrawn from the ground removing therewith the majority of earth which has been cut therefrom and leaving only a small quantity to be subsequently removed. It will thus be seen that the tool by a very simple operation forms the anchor receiving well A, the excavation B provided with the semi-annular steps C and D and the semi-cylindrical recesses E at diametrically opposite sides. It is obvious from the construction of the trap that space afforded by the step C supports the bail and one of the jaws 10 while the step D supports the remaining jaw 10. The telescopic spring housing sections 13 and 14 are adapted to be received by the semi-cylindrical recesses E, and the anchor is arranged in the well A while the body of the trap and anchor chain are afforded sufficient receiving space in the excavation B.

The jaws 41 and 42 are provided with the wire cutting notches 80 in the confronting edges thereof. The arm 36 and the lever 39 constitute the handles for operating the jaws 41 and 42. The bifurcated foot 54 of the spade handle 51 may be utilized for the purpose of withdrawing the anchor from the well as illustrated in Fig. 10 of the drawings. In this use, a plank P is preferably arranged across the excavation to provide a seat or bearing for the inner end of the arm 36 which functions as a lever for extracting the anchor. The bifurcated foot straddles the anchor rod 18 and engages under the spherical head 20. The extreme outer free end of the lever 39 is provided with a right angularly disposed extremity 81 which is slotted as at 82, and said extremity may be utilized as illustrated in Fig. 11 of the drawings for positioning the anchor in the well A and for the purpose of tamping the earth over the anchor plate or disk 19.

The head 32 of the shank is provided with a radially disposed lug 83 projecting in a plane parallel to the pivotal movement of the arm 36 and said lug is provided with a depending nose 84. The lever 39 is slotted as at 84 to receive the lug 83 when the tool is folded and a turn button 85 is pivoted as at 86 adjacent said slot and is designed to engage under the nose 84 for the purpose of locking the tool in folded position. To fold the tool, the arm 36 is swung parallel to the shaft 30 at the opposite side of the head from which the lug 83 extends and the lever 39 is swung upwardly and substantially parallel to the shank at the opposite side thereof as clearly illustrated in Fig. 2 of the drawings. The spade shank 51 is swung to a position to lie between the bars 37 and the slide 46 is shifted to retain the spade handle against movement, the spade being disposed between the offset portions 50.

By reference to Fig. 14 of the drawings it will be observed that the tool may be also employed in the capacity of a chain pulling or wire stretching device. In this connection, use is made of a grapple device 87 which includes a pair of semi-circular members 88 provided with flanges 89 between which are pivoted the grapple arms 90. The connected extremities of the grapple arms are provided with lugs 91 which are designed to be received by the recesses 92 formed in the shank. The opposite extremities of the grapple arms are provided with hooks 93 which are adapted to co-act and engage with a link or any other device to which the tool is designed to be attached during the pulling or stretching operation. Where a wire, rope or similar element is to be stretched or pulled, a chain length including a plurality of links 94 is attached to one extremity of the same and one of the links is engaged over the lug 83 behind its nose 84. The bifurcated foot 54 of the spade shank 51 is brought into play and by swinging the arm 36 upwardly, the said foot is engaged with one of the links. The arm 36 is then swung downwardly to exert a pull on the chain and to dispose one of the successive links over the lug 83, as the arm 36 is swung upwardly again the link will be disposed under the lug behind the nose 84, the space between the furcations of the foot permitting the release of the same.

From the foregoing it will be appreciated that the tool may be employed in the following capacities; as a reamer or excavating tool for preparing the ground to receive the trap and anchor; the reamer also serving as a gage for the depth of the excavation; as a lever spade for cutting a semi-circular recess at diametrically opposite points to receive the spring housing of the trap; as clamping tongs or pliers for compressing the spring housing sections to set the trap jaws; as an anchor placing or seating device; as a tamping rod for tamping the dirt in the anchor well over the anchor plate; as shears for cutting off the feet of an animal preparatory to skinning the same, the leverage being sufficient to sever the bone; as a lever hook for extracting the anchor from the well when it is desired to move the trap; as a wire cutter; and as a stretching or pulling device.

While there has been illustrated and described a single and preferred embodiment of the invention, no limitation is necessarily made to the precise structural details as it is understood that variations and modifications which properly fall within the scope of the appended claims may be resorted to when found expedient.

I claim:

1. In a tool adapted to set and position a trap and trap anchor of the character set forth, means for simultaneously forming the anchor receiving well and a concentric trap receiving excavation.

2. In a tool adapted to set and position a trap and trap anchor of the character set forth, means for simultaneously forming the anchor receiving well and a concentric trap receiving excavation, and means for receiving and effecting the removal of the earth excavated from said trap receiving excavation.

3. In a tool adapted to set and position a trap and trap anchor of the character set forth, means for simultaneously forming the anchor receiving well and a concentric trap receiving excavation, and means for positioning the anchor in said well and effecting its removal therefrom.

4. A tool for use in connection with a trap and anchor of the character set forth comprising a shank adapted to be driven into the ground to form an anchor receiving well, and means carried by said shank adapted upon rotation of the same to form an excavation concentric with the anchor receiving well for the reception of the trap proper.

5. A tool for use in connection with a trap and anchor of the character set forth comprising a shank adapted to be driven into the ground to form an anchor receiving well, and means carried by said shank adapted upon rotation of the same to form an excavation concentric with the anchor receiving well for the reception of the trap proper, said means comprising a sleeve adapted to be positioned upon the shank, a pair of radial arms having upturned extremities extending from opposite sides of the sleeve, said arms each having a beveled side providing a cutting edge.

6. In a tool adapted for use in connection with a trap and anchor of the character set forth, a shank adapted to be driven into the ground to form the anchor receiving well, and means carried by the shank and operable upon rotation thereof for cutting and removing the earth around said shank to provide an excavation concentric to the vertical axis of the anchor well for the reception of the trap proper.

8. In a tool adapted for use in connection with a trap and anchor of the character set forth, a shank adapted to be driven into the ground to form an anchor receiving well, an arm pivoted thereto for vertical movements, a semi-circular spade pivoted to said arm, and means carried by said shank and operable upon rotation thereof for cutting and removing the earth around said shank to provide an excavation concentric to the vertical axis of the anchor well for the reception of the trap proper, said arm affording means for rotating the shank and said spade being operable upon vertical movement of the arm to effect the cutting of a semi-cylindrical recess in the periphery of the excavation.

9. For use in connection with a trap and anchor of the character set forth, a tool comprising means for preparing the ground for the reception of the trap and anchor, means for positioning the anchor, means for extracting the anchor and means for setting the trap jaws.

10. For use in connection with a trap and anchor of the character described, a tool comprising a shank, an arm including a pair of spaced centrally connected bars embracing the shank and pivoted thereto at their inner ends, a lever pivoted therebetween adjacent the opposite end to provide clamping jaws for setting the trap jaws and means detachably associated with the shank for simultaneously forming an excavation concentric with a well formed by the shank when the same is driven into the ground and rotated by means of said arm.

11. A tool of the character described comprising a shank, an arm pivoted thereto for vertical movements, a lever pivoted adjacent to the free extremity of said arm and having a portion extending beyond the outer end of the pivot adapted to co-act with the extremity of the arm to constitute relatively movable clamping jaws, and means shiftable on the arm and adapted to co-act with the lever jaw to position and retain the lever in prolongation of and alinement with the arm to increase the leverage of the same.

WILLIAM R. LAZENBY.